(12) United States Patent
Janssen

(10) Patent No.: US 7,856,088 B2
(45) Date of Patent: Dec. 21, 2010

(54) SYSTEM AND METHOD FOR INTEGRATING HETEROGENEOUS TELEPHONE MAILBOXES

(75) Inventor: Holger Janssen, Richmond (CA)

(73) Assignee: VTech Telecommunications Limited, Hong Kong (HK)

( * ) Notice: Subject to any disclaimer, the term of this patent is extended or adjusted under 35 U.S.C. 154(b) by 734 days.

(21) Appl. No.: 11/027,942

(22) Filed: Jan. 4, 2005

(65) Prior Publication Data

US 2006/0146989 A1 Jul. 6, 2006

(51) Int. Cl.
*H04M 1/64* (2006.01)
(52) U.S. Cl. .............. 379/88.22; 379/68; 379/88.13; 379/121.04; 379/133
(58) Field of Classification Search ..... 379/67.1–88.28, 379/93.09, 211.01, 211.02, 93.01, 212.01, 379/159, 160, 167.01–167.02, 177–187, 379/121.04, 121.05, 133, 266.1; 370/352; 455/406, 462, 550.1, 463, 557, 412.1–413; 709/238
See application file for complete search history.

(56) References Cited

U.S. PATENT DOCUMENTS

| | | | | |
|---|---|---|---|---|
| 5,422,936 A * | 6/1995 | Atwell | ............. | 379/88.23 |
| 5,995,596 A * | 11/1999 | Shaffer et al. | ............. | 379/88.18 |
| 6,029,071 A * | 2/2000 | Bertocci et al. | ............. | 455/463 |
| 6,208,714 B1 * | 3/2001 | Brablec | ............. | 379/67.1 |
| 6,778,654 B1 * | 8/2004 | Takatori et al. | ............. | 379/212.01 |
| 2001/0012286 A1 * | 8/2001 | Huna et al. | ............. | 370/352 |
| 2001/0021659 A1 * | 9/2001 | Okamura | ............. | 455/557 |
| 2002/0106061 A1 * | 8/2002 | Siemens | ............. | 379/67.1 |
| 2002/0122543 A1 * | 9/2002 | Rowen | ............. | 379/93.01 |
| 2003/0002632 A1 * | 1/2003 | Bhogal et al. | ............. | 379/67.1 |
| 2003/0215078 A1 * | 11/2003 | Brahm et al. | ............. | 379/211.02 |
| 2004/0203579 A1 * | 10/2004 | Comp | ............. | 455/406 |
| 2005/0249336 A1 * | 11/2005 | Basir et al. | ............. | 379/79 |
| 2006/0029195 A1 * | 2/2006 | Mullis et al. | ............. | 379/88.17 |
| 2006/0059272 A1 * | 3/2006 | Lincke et al. | ............. | 709/238 |
| 2006/0072711 A1 * | 4/2006 | Muller | ............. | 379/67.1 |

* cited by examiner

*Primary Examiner*—MD S Elahee
(74) *Attorney, Agent, or Firm*—McAndrews, Held & Malloy, Ltd.

(57) ABSTRACT

A system and method for integrating heterogeneous phone message mailboxes in a common interface. A message record is created in a data structure of a local telephone device when a phone message received over a first telephone line is stored in a local answering device is completed. A message alert is received when a remote phone message is stored in a remote mailbox associated with a second telephone line linked to the local telephone device. The remote phone message is sent to the local telephone device for silent playback. The remote message is marked as old at the remote mailbox. A message record is created in the data structure corresponding to the remote message. A program operates to produce an ordered message record list in the data structure that includes, for example, an interleaved chronological list of all phone messages stored in the local and remote mailboxes.

45 Claims, 17 Drawing Sheets

300

| | Timestamp Date, Time | length | Caller Information Phone number, name | Local ITAD or Voicemail | New / Old | Index to local ITAD | Index in Voicemail |
|---|---|---|---|---|---|---|---|
| A | Tu Sept, 14 10:32 AM | 20 s | 604 123 4567 John Smith | Local | Old | 1 | |
| B | Tu Sept, 14 12:35 AM | 45 s | 604 456 7890 Arnold Peter | Local | New | 2 | |
| C | Tu Sept, 14 6:40 PM | 123s | 604 123 4567 John Smith | Local | New | 3 | |
| E | Wed Sept, 15 6:55 AM | 240s | 732 111 2222 Bob Chu | Voicemail | Old | | 1 |
| D | Wed Sept, 15 8:45 AM | 15 s | 604 123 4567 John Smith | Local | New | 4 | |
| F | Wed Sept, 15 10:45 AM | 240s | 732 987 6543 Barbara Long | Voicemail | New | | 2 |
| G | Wed Sept, 15 12:31 PM | 600s | 732 987 6543 Advertizing Inc | Voicemail | New | | 3 |

| Timestamp Date, Time | length | Caller Information Phone number, name | Local ITAD or Voicemail | New / Old | Index to local ITAD | Index in Voicemail |
| --- | --- | --- | --- | --- | --- | --- |
| Tu Sept, 14 10:32 AM | 20 s | 604 123 4567 John Smith | Local | Old | 1 | |
| Tu Sept, 14 12:35 AM | 45 s | 604 456 7890 Arnold Peter | Local | Old | 2 | |
| Tu Sept, 14 6:40 PM | 123s | 604 123 4567 John Smith | Local | Old | 3 | |
| Wed Sept, 15 6:55 AM | 240s | 732 111 2222 Bob Chu | Voicemail | Old | | 1 |
| Wed Sept, 15 8:45 AM | 15 s | 604 123 4567 John Smith | Local | Old | 4 | |
| Wed Sept, 15 10:45 AM | 240s | 732 987 6543 Barbara Long | Voicemail | Old | | 2 |
| Wed Sept, 15 12:31 PM | 600s | 732 987 6543 Advertizing Inc | Voicemail | Old | | 3 |
| Wed Sept, 15 12:42 PM | 12s | 604 123 4567 John Smith | Local | Old | 5 | |

| Timestamp Date, Time | length | Caller Information Phone number, name | Local ITAD or Voicemail | New / Old | Index to local ITAD | Index in Voicemail |
|---|---|---|---|---|---|---|
| Tu Sept, 14 10:32 AM | 20 s | 604 123 4567 John Smith | Local | Old | 1 | |
| Tu Sept, 14 12:35 AM | 45 s | 604 456 7890 Arnold Peter | Local | New | 2 | |
| Tu Sept, 14 6:40 PM | 123s | 604 123 4567 John Smith | Local | New | 3 | |
| Wed Sept, 15 6:55 AM | 240s | 732 111 2222 Bob Chu | Voicemail | Old | | 1 |
| Wed Sept, 15 8:45 AM | 15 s | 604 123 4567 John Smith | Local | New | 4 | |
| Wed Sept, 15 10:45 AM | 240s | 732 987 6543 Barbara Long | Voicemail | New | | 2 |
| Wed Sept, 15 12:31 PM | 600s | 732 987 6543 Advertizing Inc | Voicemail | New | | 3 |
| Wed Sept, 15 12:42 PM | 12s | 604 123 4567 John Smith | Local | New | 5 | |
| Wed Sept, 15 3:22 PM | 30s | 732 111 2222 Bob Chu | Voicemail | New | | 4 |

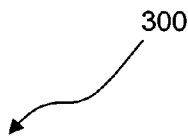

| Timestamp Date, Time | length | Caller Information Phone number, name | Local ITAD or Voicemail | New / Old | Index to local ITAD | Index in Voicemail |
|---|---|---|---|---|---|---|
| Tu Sept, 14 10:32 AM | 20 s | 604 123 4567 John Smith | Local | Old | 1 | |
| Tu Sept, 14 12:35 AM | 45 s | 604 456 7890 Arnold Peter | Local | Od | 2 | |
| Tu Sept, 14 6:40 PM | 123s | 604 123 4567 John Smith | Local | Old | 3 | |
| Wed Sept, 15 6:55 AM | 240s | 732 111 2222 Bob Chu | Voicemail | Old | | 1 |
| Wed Sept, 15 8:45 AM | 15 s | 604 123 4567 John Smith | Local | Old | 4 | |
| Wed Sept, 15 10:45 AM | 240s | 732 987 6543 Barbara Long | Voicemail | Old | | 2 |
| Wed Sept, 15 12:31 PM | 600s | 732 987 6543 Advertizing Inc | Voicemail | Old | | 3 |
| Wed Sept, 15 12:42 PM | 12s | 604 123 4567 John Smith | Local | Old | 5 | |
| Wed Sept, 15 3:22 PM | 30s | 732 111 2222 Bob Chu | Voicemail | Old | | 4 |

903 points to row 3; 904 points to row 7

Fig. 9

| Timestamp Date, Time | length | Caller Information Phone number, name | Local ITAD or Voicemail | New / Old | Index to local ITAD | Index in Voicemail |
|---|---|---|---|---|---|---|
| Tu Sept, 14 10:32 AM | 20 s | 604 123 4567 John Smith | Local | Old | 1 | |
| Tu Sept, 14 12:35 AM | 45 s | 604 456 7890 Arnold Peter | Local | Od | 2 | |
| Wed Sept, 15 6:55 AM | 240s | 732 111 2222 Bob Chu | Voicemail | Old | | 1 |
| Wed Sept, 15 8:45 AM | 15 s | 604 123 4567 John Smith | Local | Old | 3 | |
| Wed Sept, 15 10:45 AM | 240s | 732 987 6543 Barbara Long | Voicemail | Old | | 2 |
| Wed Sept, 15 12:31 PM | 600s | 732 987 6543 Advertizing Inc | Voicemail | Old | | 3 |
| Wed Sept, 15 12:42 PM | 12s | 604 123 4567 John Smith | Local | Old | 4 | |
| Wed Sept, 15 3:22 PM | 30s | 732 111 2222 Bob Chu | Voicemail | Old | | 4 |

Fig. 13

| Timestamp Date, Time | length | Caller Information Phone number, name | Local ITAD or Voicemail | New / Old | Index to local ITAD |
|---|---|---|---|---|---|
| Tu Sept, 14 10:32 AM | 20 s | 604 123 4567 John Smith | Local | Old | 1 |
| Tu Sept, 14 12:35 AM | 45 s | 604 456 7890 Arnold Peter | Local | New | 2 |
| Tu Sept, 14 6:40 PM | 123s | 604 123 4567 John Smith | Local | New | 3 |
| Wed Sept, 15 8:45 AM | 15 s | 604 123 4567 John Smith | Local | New | 4 |

| Timestamp Date, Time | length | Caller Information Phone number, name | Local ITAD or Voicemail | New / Old | Index in Voicemail |
|---|---|---|---|---|---|
| Wed Sept, 15 6:55 AM | 240s | 732 111 2222 Bob Chu | Voicemail | Old | 1 |
| Wed Sept, 15 10:45 AM | 240s | 732 987 6543 Barbara Long | Voicemail | New | 2 |
| Wed Sept, 15 12:31 PM | 600s | 732 987 6543 Advertizing Inc | Voicemail | New | 3 |

| Timestamp Date, Time | length | Caller Information Phone number, name | Local ITAD or Voicemail | New / Old | Index to local ITAD | Index in Voicemail |
|---|---|---|---|---|---|---|
| Tu Sept, 14 10:32 AM | 20 s | 604 123 4567 John Smith | Local | Old | 1 | |
| Tu Sept, 14 12:35 AM | 45 s | 604 456 7890 Arnold Peter | Local | New | 2 | |
| Tu Sept, 14 6:40 PM | 123s | 604 123 4567 John Smith | Local | New | 3 | |
| Wed Sept, 15 6:55 AM | 240s | 732 111 2222 Bob Chu | Voicemail | Old | | 1 |
| Wed Sept, 15 8:45 AM | 15 s | 604 123 4567 John Smith | Local | New | 4 | |
| Wed Sept, 15 10:45 AM | 240s | 732 987 6543 Barbara Long | Voicemail | New | | 2 |
| Wed Sept, 15 12:31 PM | 600s | 732 987 6543 Advertizing Inc | Voicemail | New | | 3 |

| Timestamp Date, Time | length | Caller Information Phone number, name | Local ITAD or Voicemail | New / Old | Index to local ITAD | Index to voicemail |
|---|---|---|---|---|---|---|
| Tu Sept, 14 10:32 AM | 20 s | 604 123 4567 John Smith | Local | Old | 1 | |
| Tu Sept, 14 12:35 AM | 45 s | 604 456 7890 Arnold Peter | Local | New | 2 | |
| Tu Sept, 14 6:40 PM | 123s | 604 123 4567 John Smith | Local | New | 3 | |
| Wed Sept, 15 8:45 AM | 15 s | 604 123 4567 John Smith | Local | New | 4 | |
| Wed Sept, 15 6:55 AM | 240s | 732 111 2222 Bob Chu | Voicemail | Old | | 1 |
| Wed Sept, 15 10:45 AM | 240s | 732 987 6543 Barbara Long | Voicemail | New | | 2 |
| Wed Sept, 15 12:31 PM | 600s | 732 987 6543 Advertizing Inc | Voicemail | New | | 3 |

Fig. 16d

SYSTEM AND METHOD FOR INTEGRATING HETEROGENEOUS TELEPHONE MAILBOXES

BACKGROUND

1. Field of the Invention

The present invention relates generally to telephone systems. More particularly, the present invention relates to systems for processing telephone voice messages.

2. Background

With recent innovations in telecommunications, many different affordable services and technologies are currently available to home and business telephone users, including voicemail services. In addition to the availability of conventional stand alone telephone answering devices (TAD) or integrated telephone answering devices (ITAD) that are connected locally to a landline telephone for storing phone messages, voicemail services are available from telephony service providers associated with plain old telephone system (POTS) technology or with alternatives such as cell phone and internet telephony.

Internet telephony, or Voice over Internet Protocol (VoIP), is a rapidly emerging technology that allows a user to conduct a telephone conversation where voice is transmitted over the internet from and to the user by a digital device such as a computer or internet telephone. As illustrated in FIG. 1, a VoIP user can place a phone call using a computer 102 equipped with a microphone and speakers (not shown) to transmit and receive a conversation with a called party. The caller's voice is received in the microphone and digitized for transmission as data packets over a data network such as the internet 104, and received by the called party, who may either employ a traditional telephony device 106 or use a device supporting VoIP, such as computer 108. Alternatively, the same functions can be incorporated into an "IP" telephone 110 that resembles a traditional handset, and is provided with an analog telephone adapter (ATA) 112 to send and receive digital data carried over the internet. VoIP ATAs can be included within an IP telephone device or external to a telephone. VoIP provides potential advantages over traditional POTS telephone service in that voice information is carried as packets, and can be transmitted over communication networks more efficiently, allowing VoIP providers to reduce call charges for a VoIP user.

In spite of advantages of emerging telephone technologies, for many telephone users, it may be desirable to maintain a traditional POTS line as well as a line employing an emerging technology device such as a VoIP line. For example, a user having a traditional POTS telephone line can receive telephone messages locally using an ITAD connected to her telephone, and check messages with only one touch of a keypad on the ITAD. Thus, the user can potentially save time when checking messages at home, without having to access a remote voicemail server typically employed for storing voicemail. Alternatively, a user may wish to maintain a traditional POTS phone line with local ITAD message recording for personal use together with a separate business phone line having a separate voicemail service. Thus, in many cases, it may be desirable for a user to have separate phones connected over separate lines to phone service providers, for example one POTS line and one VoIP line. In the latter case, a dual line phone that contains both a POTS line and a VoIP line connected to a voicemail provider would serve the same purpose as two phones with separate lines.

In a dual line phone, both a traditional analog phone line (which could be connected to a POTS service provider) and a digital VoIP line connection can be incorporated in a single device, so that a user can access the VoIP line or analog line using the same device. In the latter example, a user could maintain the VoIP line with voicemail services for business purposes and the analog line with a local TAD or ITAD for personal calls.

A problem for a user managing multiple types of phone lines, such as having a POTS/ITAD together with a VoIP service or POTS/voicemail service, is the lack of ability to coordinate services between the different phone lines. Although a user might use different lines for different purposes, often there will be an overlap in uses and callers in the different lines. Thus, a user may often receive "business calls" or phone messages on her personal line, or personal communications on her business line. As an example, because the type of phone message service provided may vary between lines as described above, a user might encounter difficulty managing phone messages between different lines. As mentioned, VoIP service providers typically supply voicemail services that operate similar to conventional voicemail services in that messages are stored remotely and accessed by a user connecting to the service over a telephone lines and/or data network line. More specifically, voicemail messages associated with VoIP calls received at the user's phone are stored in a remote database ("mailbox") (often also referred to as voicemail) of the VoIP service provider, and are retrieved by a user connecting to the database, typically by dialing a series of DTMF tones and entering codes. On the other hand, calls received on the user's POTS line may be stored in a separate "mailbox" in the local TAD device. For a phone user wishing to review messages received on such different lines, the process can be cumbersome. In the first place, a user might not be sure of where messages from a particular party are located with respect to two mailboxes, a VoIP and a POTS mailbox. Also, a chronological sequence of messages distributed between the mailboxes may be lost when a user plays back a series of messages, first in one mailbox, then in the other. Additionally, a user wishing to retrieve a particular message of interest for playback may not remember which mailbox the message resides in. Finally, a user may miss important messages because only one mailbox is reviewed. In light of the foregoing, there is a need to improve the integration of multiple types of phone services for a user maintaining more than one phone line.

SUMMARY OF THE INVENTION

In an embodiment of the present invention, a messaging system for managing heterogeneous phone mailboxes comprises a local mailbox linked to a first phone line through a first communications interface. Preferably, the first line is provided to receive telephone services from a first service provider, such as a POTS service provider. A second communications interface is provided to receive telephone services over a second line from a second service provider. Preferably, the second service provider provides voicemail services to the user. An integrated mailbox interface is provided to receive information related to messages stored in the local mailbox as well as those stored in a remote mailbox linked to the second phone line. Preferably, the integrated mailbox interface (or integrated interface) creates an integrated mailbox environment by which a user can access and manipulate phone messages received in the ITAD and phone messages received by the voicemail service of the second line. Preferably, the integrated interface allows the user to view and sort messages by criteria such as chronological order received, position in a message queue, and the like.

In another embodiment of the present invention, a method for managing phone messages between heterogeneous mailboxes includes receiving a first phone message over a first phone line in a first mailbox that is local to a user telephone device. A first message record is created in a data structure of an integrated message interface. A second mailbox associated with a second user telephone line and located remote to the user telephone device receives a second phone message and stores it as a remote voicemail message. Indication of a message received at the remote mailbox is received in the user telephone device when a message is recorded in the remote mailbox. The voicemail service provider containing the remote mailbox is accessed by the message device. Preferably, the message recorded in the remote mailbox is played back by an integrated message device and marked as reviewed at the voicemail provider. A time of playback of the remote message is recorded by the telephone device. The message is marked as old in the remote mailbox. A second message record of the second message is created in the data structure. By repeating the above process steps, a sorted list of local messages and remote voicemail messages is created in the data structure. Preferably, the sorted list includes a chronological list of all local messages and remote voicemail messages.

DESCRIPTION OF THE DRAWINGS

FIG. 3 depicts a data structure comprising a master list of messages, constructed according to an exemplary embodiment of the present invention.

FIG. 6 illustrates the data structure of FIG. 3 after it is updated with a new entry.

FIG. 7 illustrates addition of an exemplary record to the data structure of FIG. 3.

FIG. 9 illustrates the data structure of FIG. 3 after a user performs a <review all new messages> operation.

FIG. 13 illustrates the effect of deletion of a record from the data structure of FIG. 3.

FIG. 16a illustrates an exemplary data structure from messages stored in a local ITAD.

FIG. 16b illustrates a data structure that contains chronologically ordered message records pertaining to VoIP messages that are stored in a remote mailbox.

FIG. 16c illustrates one exemplary data structure formed according to the method of FIG. 15.

FIG. 16d illustrates another exemplary data structure formed according to the method of FIG. 15.

DETAILED DESCRIPTION OF THE INVENTION

Figure 1:
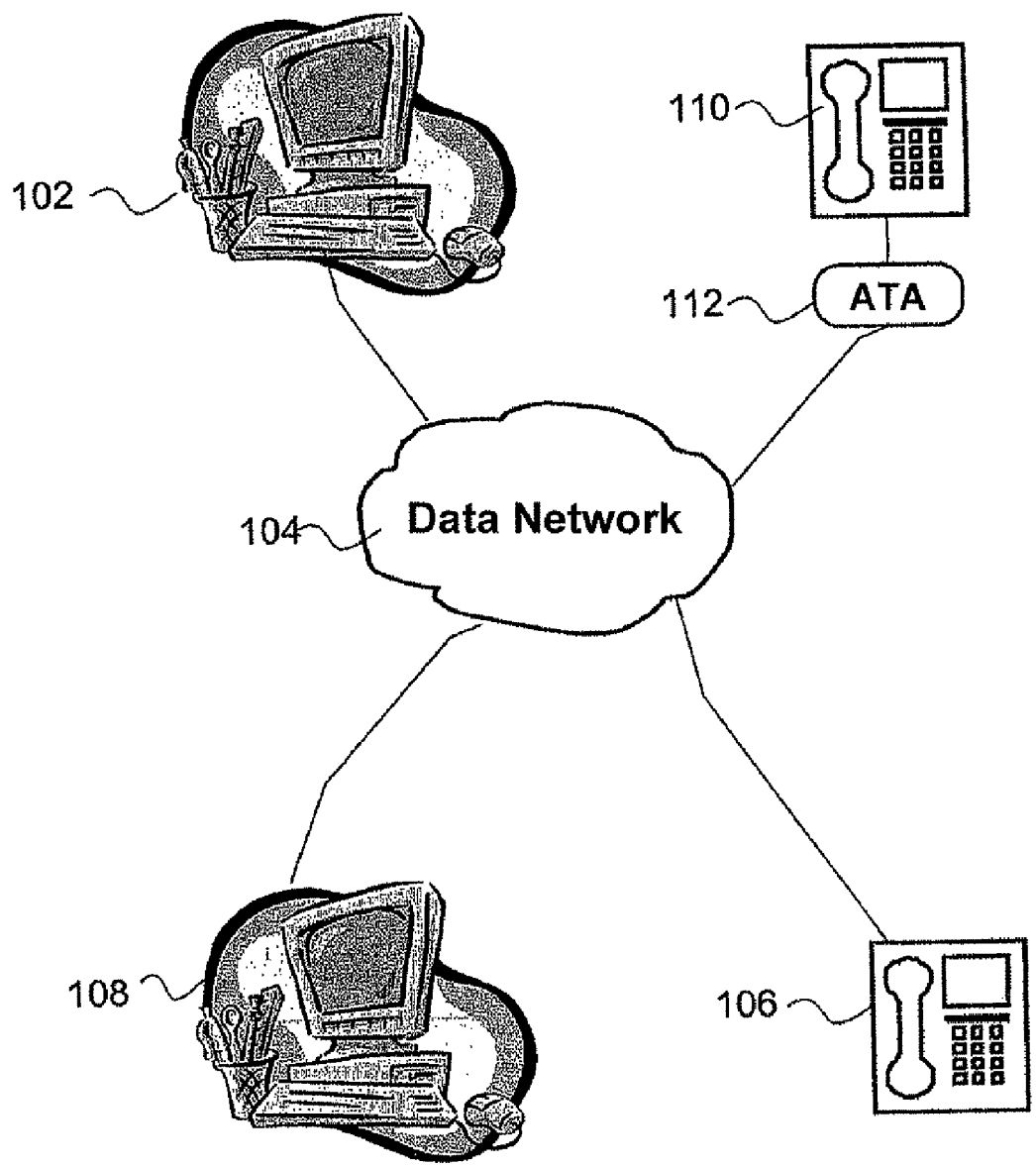
FIG. 1 illustrates a known VoIP system.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

Embodiments of the present invention relate to a system and method for providing a user with a common phone voice mail interface to retrieve and organize phone messages stored in a plurality of heterogeneous mailboxes, where the term "heterogeneous" refers to a plurality of mailboxes that have substantially differing individual user interfaces. In exemplary embodiments, the individual mailboxes are linked to separate phone lines associated with the user. As used herein the term "mailbox" (or "phone mailbox") refers to an entity for managing of phone messages, including a recording medium of a local TAD containing messages recorded by the TAD; a voicemail entity, such as a remote computer, memory, or other storage medium that contains a record of phone messages sent over a telephone line associated with the user, and stored at a location remote to a user telephone associated with the telephone line. The term "remote" denotes the fact the mailbox is accessed by the user through an analog phone line, a data network, a wireless network, or combinations of the above.

For example, a mailbox in a TAD that is directly connected to a user's phone device (hereinafter termed "local") has a substantially different interface for the user than a voicemail mailbox of a voicemail service provider located remotely. In the former case, the mailbox can be accessed typically by pressing a single key that is located on the TAD or phone device (for an ITAD). In the latter case, the mailbox is accessed by the user by sending a DTMF or other communication signal over a phone line or wireless network to link to the service provider, and subsequently entering other signals to directly link to the user's mailbox. Consequently, the TAD mailbox and voicemail mailbox are termed heterogeneous. By contrast, two separated remote voicemail mailboxes provided by the same service provider and accessed in the same manner by a user would be considered homogeneous.

Figure 2:
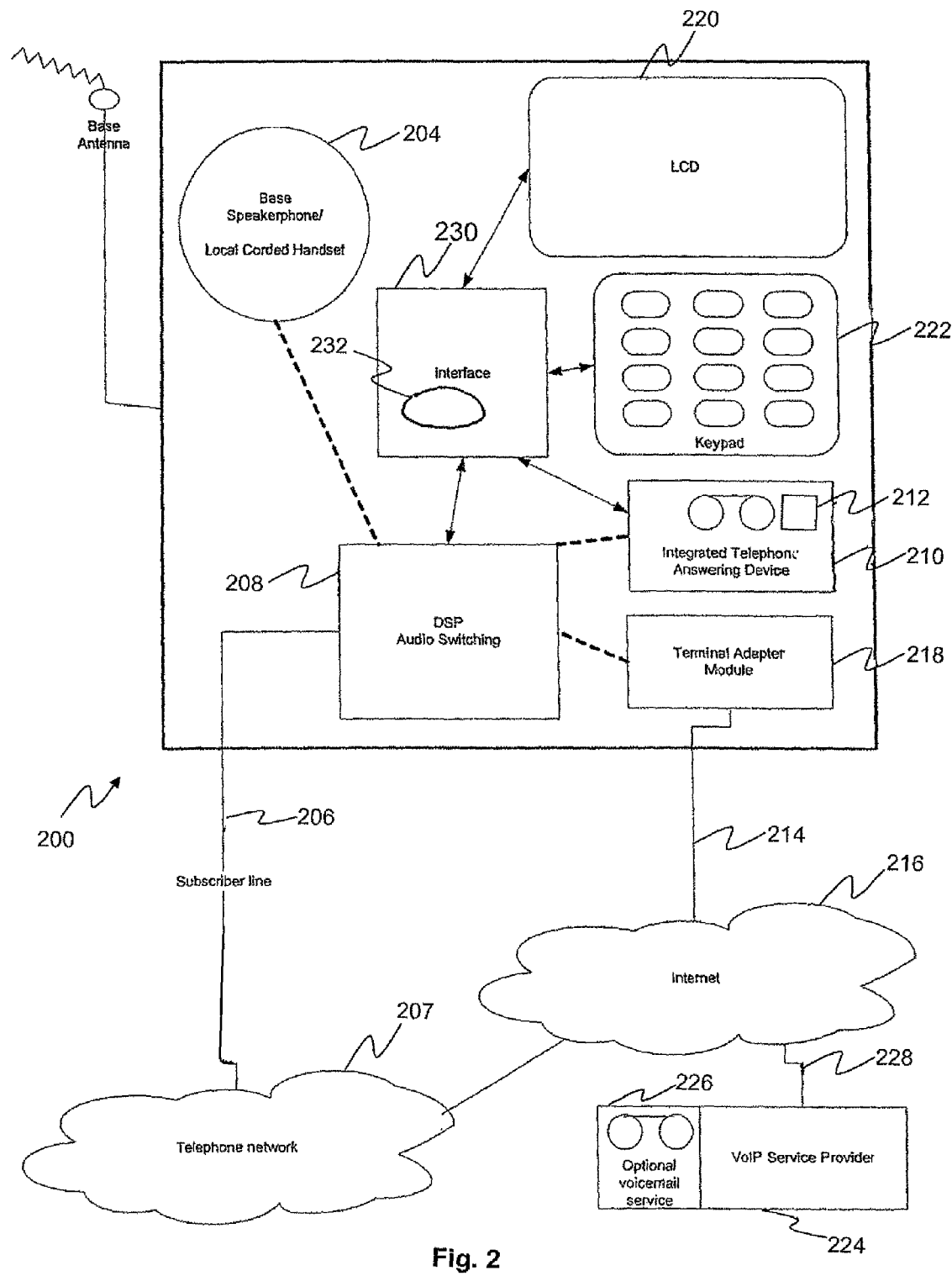
FIG. 2 depicts an integrated phone message management system according to an exemplary embodiment of the present invention.

FIG. 2 depicts an integrated phone message management system 200 according to an exemplary embodiment of the present invention. System 200 includes a hybrid phone base device 202 that contains a telephone handset/speaker phone 204, that can playback phone messages. System 200 is equipped to receive an analog telephone line 206 that transmits analog voice information received from network 207 to device 202. Phone voice messages transmitted over line 206 through digital signal processor (DSP) 208 can be stored using ITAD 210 that is configured to store a phone message based on a caller's input, according to known methods. A phone message received by system 200 on line 206 can be stored, for example, in local mailbox 212 associated with ITAD 210.

In the example shown in FIG. 2, system 200 is further equipped to receive a digital, second line 214 that can transmit digital information to and from data network 216. Line 214 couples to terminal adapter module, or analog telephone adapter "ATA" 218 so that incoming digital voice data can be transformed into audible voice information for a user to hear using handset/speaker 204. Conversely, audible information sent from base device 202, such as voice and DTMF signals, can be transformed into digital form using ATA 218 for transmission over line 214. In a preferred embodiment, ATA 218 is configured to provide communication over line 214 using VOIP technology. It is contemplated that the present invention can be configured to process other protocols.

Preferably, a display 220 includes a pixel based LCD display that displays such features as data and time, calling party name and number, and digits dialed. Preferably, keypad 222 provides alphanumeric keys for dialing and additional keys such as soft key tabs to control menu selection for manipulating messages in conjunction with display 220.

A user employing device 202 for phone message retrieval for messages transmitted over lines 206 or 214 can access the messages according to known methods. For example, a phone message sent over line 206 and recorded in mailbox 212 of ITAD 210 can be accessed using a play message key (not shown) of keypad 222. Accordingly, a message or group of messages stored in mailbox 210 can be played back over handset/speaker 204. Additionally, if a call is not answered on line 214, a caller calling the user at device 202 over VoIP line 214 can be prompted by VoIP service provider 224 to record a message that is stored by VoIP service provider 224 in mailbox 226.

A caller (not shown) can connect to a user at device 202 by dialing a number associated with line 214. A call is received at network 216 and proceeds over line 214 that is connected to module 218. The caller can be prompted to leave a voice message for an unanswered call that is forwarded over line 228 to voicemail mailbox 226 where the call is stored. A user at device 202 can retrieve the message by known methods such as sending a DTMF tone sequence to access service provider 224, and entering a series of coded signals to access mailbox 224. Accordingly, the user can review and playback voicemail messages stored in VoIP mailbox 226.

In addition, system 200 provides an interface 230 used to receive input from mailbox 226 and mailbox 212. In an exemplary embodiment, interface 230 is contained in a processing unit (also depicted in FIG. 2 using reference number 230, for simplicity). In one embodiment, interface 230 that includes a software program 232 that is configured to allow a user to manipulate messages in mailboxes 226 and 212. For example, a user can produce a "master" list, meaning a list of all undeleted phone messages that reside in mailboxes 226 and 212. Using a softkey or a command such as <display messages>, interface 230 creates a list of message records from mailboxes 226, 212 to be displayed on display 220. As used hereinafter, the term "message record" refers to a record containing information related to an audio voicemail message, where the message record itself does not contain audio information. The message record can contain, for example, caller information and time received associated with a recorded audio voicemail message. In addition, as described in more detail below, a user can retrieve an ordered master message list, for example, a master list sorted by time that contains the content of two individual messages lists, one from each mailbox 212, 226 such that the messages from the two lists are interleaved by program 232 according to a chronological order received.

FIG. 3 depicts a data structure 300. Preferably, data structure 300 includes a master list of messages received at mailboxes 212 and 226, which is constructed according to an exemplary embodiment of the present invention. Data structure 300 is preferably configured to include one or more fields for a time that a message is received, a message length, caller information, location of the mailbox containing the message, message status, and indexing of the message. When a new message is received, information about the message is collected and stored in the appropriate fields of a single row of the data structure. Thus, as depicted in FIG. 3, message list 302 from mailbox 212 includes four messages A, B, C, and D, while message list 304 from remote mailbox 226 contains messages E, F and G. Information contained in message list 302 pertaining only to records of messages stored in the local ITAD, may also reside in a separate memory in system 200. Information contained in message list 304 pertaining to VoIP messages may likewise reside in VoIP provider 224. Program 232 creates a master list 306 stored in data structure 300, that lists the messages of lists 302 and 304 in chronological order, in this case A-B-C-E-D-F-G. A user can then manipulate list 306 in accordance with her needs. For instance, message list 306 can be played in chronological order, or a user can select to listen to only a set of messages received during a time window, for example, those received on Wednesday afternoon. Alternatively, a user can select to listen to all messages recorded from a designated source, such as a source having a given name, telephone number, and the like.

Figure 4:
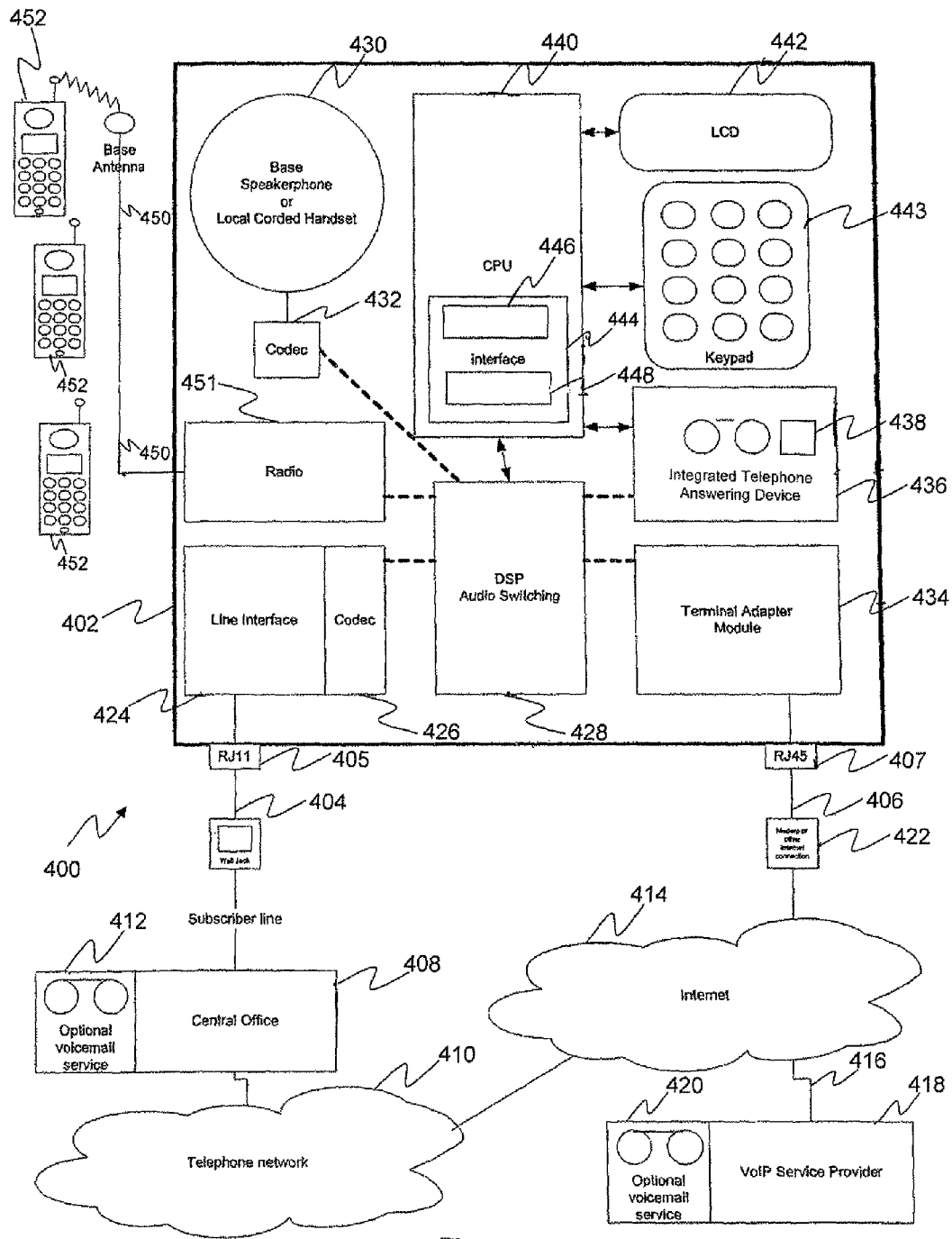
FIG. 4 depicts features of an integrated phone message management system, according to an embodiment of the present invention.

FIG. 4 depicts additional features of an integrated phone message management system 400, according to an embodiment of the present invention. Base device 402 is equipped to receive two separate phone lines, 404, 406. In a preferred embodiment, line 404 terminates at base 402 at an RJ11 plug 405, and line 406 terminates at an RJ45 plug 407. Line 404 communicates to central office 408 from which conventional analog voice telephone traffic is carried through network 410. Office 408 is optionally connected to voicemail mailbox 412. Line 406 communicates to data network 414 that is connected through line 416 to VoIP provider 418. VoIP provider 418 is preferably linked to VoIP mailbox 420. Preferably, modem 422 is provided to interface data traffic from device 402 to the data network 414.

Base 402 further includes a line interface 424 and CODEC 426 that transform analog voice signals received over line 404 to digital data, which is transmitted to digital signal processor (DSP) 428. DSP 428 is configured to transmit voice data to speaker phone/handset 430 via another CODEC 432 that transforms the data back to analog signals. Similarly, a terminal adapter module 434 is provided that receives VoIP signals over line 406 and transmits data streams to DSP 428, which, in turn, can forward the data to speaker 430 to be played as voice or other audio signals. Preferably, module 434 is configured to use a VoIP protocol and encode and decode a voice signal as performed by conventional ATA devices. Thus, base 402 allows a user to conduct phone conversations using conventional analog POTS line 404, or using VoIP line 406.

In addition, system 400 includes radio 451 that allows base 402 to communicate via base antenna 450 with wireless handsets 452. In one embodiment, handsets 402 are each configured to access, manage, and listen to messages contained in ITAD 212 and remote mailboxes 412 and 420, by using, for example, a keypad and/or speakers contained within each handset (not shown).

Base 402 also contains ITAD 436 that can record and store phone messages. For example, after a predetermined amount of rings, CPU 440 sends a signal to DSP 428 that causes ITAD 436 to prompt a caller using line 404 to leave a voice message. The voice message is then stored in local mailbox 438. Preferably, additional information, e.g., a time associated with the receipt of the voice message, is also stored. A user can then access messages stored in local mailbox 438 by entering a command, e.g., "display local messages" on keypad 443.

Preferably, when an unanswered call is received on VoIP line 406, the caller is prompted to leave a message that is forwarded to mailbox 420, according to known methods. Preferably, a signal is forwarded from VoIP provider 418 to base 402 after the message is recorded, causing an alert, e.g., a Message Waiting Indicator (MWI) alert, to be displayed on base 402 and handsets 452. For example, an MWI could appear on display 442 as a short text message "New VoIP message" on display 442. Accordingly, a user employing keypad 443 can subsequently access the message by accessing VoIP provider 418, according to known methods.

CPU 440 also contains interface 444 that can receive data from a plurality of mailboxes, and format the data for convenient display, for example on display 442. In an exemplary embodiment, interface 444 contains a software program 446 that is configured to receive instructions and operate on data received from mailboxes 438 and 420. Preferably, program 446 is stored in a read only memory (ROM) or other memory contained in CPU 440. Interface 444 also contains a data structure 448 representing data received from mailboxes 438, 420 and formatted using program 446. For example, data structure 448 can include a list of all undeleted phone messages currently stored in mailboxes 438, 420, where the messages are interleaved to form a master chronological list, as depicted in FIG. 3. Information from data structure 448 can be provided in any format convenient for a user. In one embodiment, the information is provided as a voice announcement playable on speaker 430 and handsets 452. In another embodiment information from data structure is provided as a visual output on display 442. For example, a keypad instruction <display_all messages>, is received by CPU 440 and causes program 446 to retrieve message records stored in Table 300 of FIG. 3. Information from Table 300 is then displayed as a message list on display 442. Preferably, data structure 448 comprising Table 300 is contained in an EEPROM or other programmable non-volatile storage medium that retains its memory in an event that power to base 402 is lost. In another embodiment, information from data structure 448 is simultaneously provided as a voice announcement and visual message on display 442.

Preferably, CPU 440 is configured to record a time associated with playback of a message from VoIP provider 418, such that the time is stored in a message record corresponding to the VoIP message. Alternatively, CPU 440 can be configured to record a time associated with the time an MWI is received, or a time that a data transmission is received from a VoIP service provider. When a user subsequently desires to review message records (and/or messages) received in either mailbox 438, 420, base 402 already retains a chronological list containing each message, whether the message content resides in local ITAD mailbox 438 or in VoIP mailbox 420.

Figure 5:
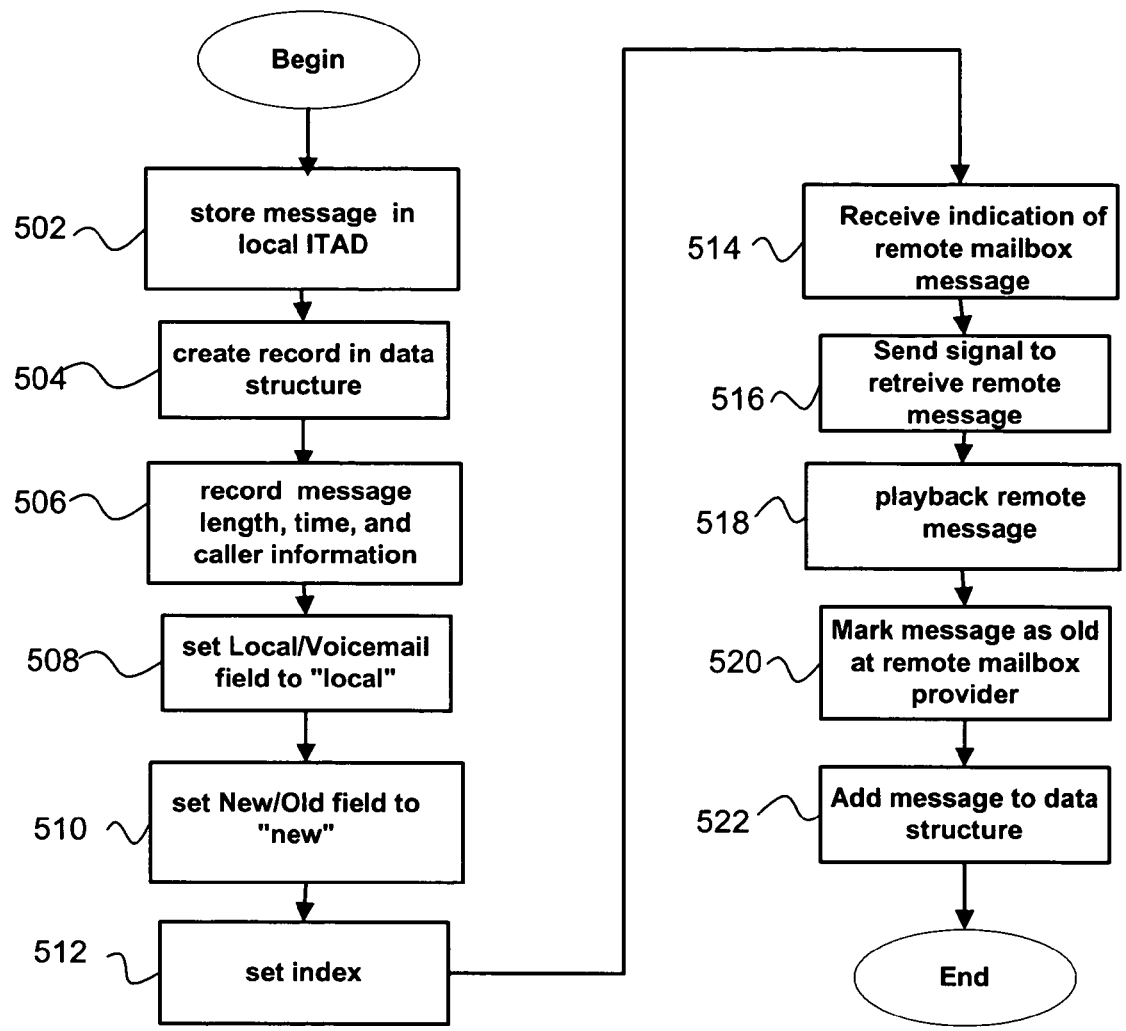
FIG. 5 depicts exemplary steps involved in a method for managing phone messages stored in a plurality of heterogeneous mailboxes, according to an embodiment of the present invention.

FIG. 5 depicts exemplary steps involved in a method for managing phone messages stored in a plurality of heterogeneous mailboxes, according to an embodiment of the present invention. Referring also to FIG. 4, in step 502, a message is received from an unanswered call sent to device 402 over analog voice phone line 404 and is stored in local ITAD mailbox 438. Preferably, the message is stored in a Flash memory or other memory associated with CPU 440.

In step 504, message information is collected and a new message record (entry) of the stored message is created in a preconfigured data structure of interface 444. The preconfigured data structure preferably has a structure similar to that of data structure 300 of FIG. 3.

Step 504 preferably includes the substep of 506, wherein a message time-stamp, message length and caller information are stored.

In a further substep 508, a "Local/Voicemail" field is set to "local" to indicate that the record corresponds to a message recorded in the ITAD local to base station 402.

In another substep 510, a "New/Old" field is set to "new" to indicate that the message is new and unreviewed.

In substep 512, an index is set for the message record that corresponds to an order of the message within a mailbox in which the message resides. FIG. 6 illustrates data structure 300 of FIG. 3 after it is updated with a new entry 602. The fields within the new entry contain information pertinent to the call, as described in substeps 506-512. The position of new entry 602 in data structure 300 is arranged according to chronological order received. Thus, entry 602 is the last entry of the table, reflecting that it is the last-in-time received of all messages in data structure 300. The index number of entry 602 reflects its position as the fifth message stored in local ITAD mailbox 438.

In step 514, an indication that a message has been received by provider 418 is received. For example, this message is received by CPU 440 and can comprise an MWI signal or other message received from VoIP provider 418. Preferably, the MWI signal is sent immediately after a VoIP message from a caller dialing device 402 is recorded in remote VoIP mailbox 420. The MWI signal can comprise a "new message" phrase displayed on LCD 442.

In step 516, a signal is sent by base device 402 to VoIP provider 418 to retrieve the VoIP message indicated in the MWI message from remote mailbox 420.

Preferably, the signal is sent by generating a DTMF tone that is transformed by module 434 into a digital signal used to access mailbox 420 and retrieve the message.

In step 518, the VoIP message is received by base 402 and marked as reviewed by VoIP provider 418. In an exemplary embodiment, the VoIP message is received by base 402 as a digital data stream and silently "played back" by ITAD 438. The silent playback is thus not disruptive of other user activities that may be taking place near the playback device at the time of silent playback. The sending of the VoIP message to base 402 alerts the VoIP service provider that the message has been reviewed. Alternatively, the message can be sent to base 402 without playback.

In step 520, VoIP service provider 418 marks the message as "old" in mailbox structure 420.

In step 522, a message record is created for the VoIP message received at base 402. Preferably, the message record contains similar information as a record for a local ITAD message. Preferably, the creation of the message record involves substeps similar to substeps 506-512.

FIG. 7 illustrates an exemplary record 702 received and stored in data structure 300. In the example shown, record 702 is placed last in the table, reflecting the fact that the message is the most recent to be received by base 402. An index number 4 indicates that the message is the fourth undeleted message in VoIP mailbox 420. Message record 702 contains a time received for the message, call information, mailbox location, and also marks the VoIP message as "new" to indicate that it has not been actively played back yet by the user.

Message Management

In the following paragraphs, examples of different phone message management schemes provided by the present invention are discussed.

Figure 8:
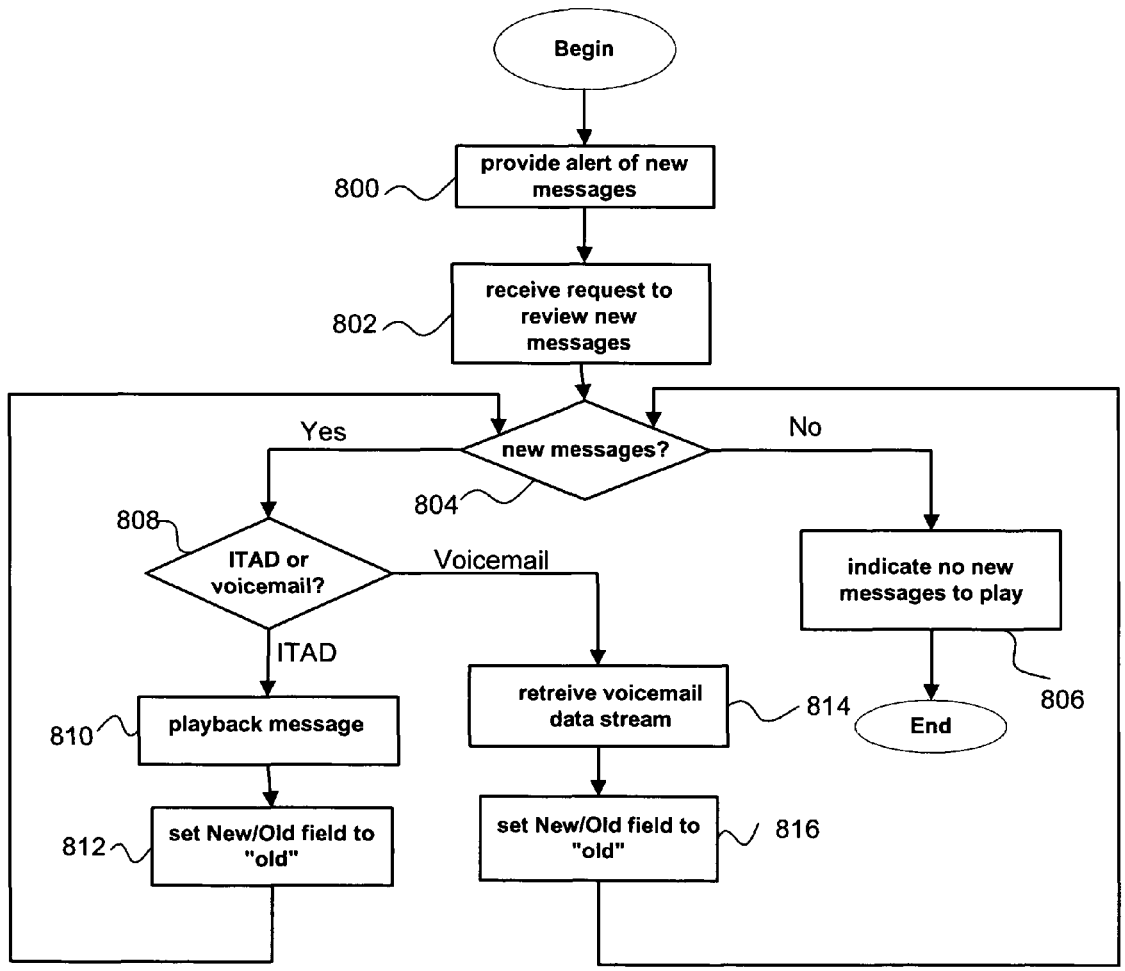
FIG. 8 illustrates exemplary steps involved in a process for managing phone messages received in heterogeneous mailboxes, according to another embodiment of the present invention

FIG. 8 illustrates additional exemplary steps involved in a process for managing phone messages received in heterogeneous mailboxes, according to an exemplary embodiment of the present invention. Continuing from step 522 in which a data structure 300 contains a current listing of a user's message records recorded in heterogeneous mailboxes, in step 800, a user is provided with an alert that new messages are present in one or more mailboxes. For example, an LED display 452 on base station 402 might be lit continuously or blinking. Alternatively, LCD 442 might display a verbal indication of new messages.

In step 802, a request is received to review new messages. For example, a user employing device 402 having keypad 443 enters <review all new messages>. CPU 440 then accesses data structure 300 of FIG. 7.

In step 804, records stored in data structure 448 are accessed by CPU 440, for example, by executing a program that reviews message records in data structure 448. The message records are checked in chronological order to determine if there are any new messages to be displayed. If a message record marked as old is encountered, the program moves to the next message. If no message records marked new are found in the data structure, the process moves to step 806, where the user is informed by an audible announcement or visual display that there are no new messages to play.

If a new message is encountered, the process moves to step 808, where the program checks to see if the message is recorded in a local ITAD or in a voicemail mailbox.

If the message record indicates a local ITAD, the process moves to step 810 where a message is played back to the user. Subsequently, in step 812, the message is marked as old in the message record.

If the message record designates a voicemail mailbox, the process moves to step 814, where a remote mail server containing the voicemail mailbox is accessed. For example, referring to FIG. 4, base 402 sends a DTMF signal to service provider 418. Service provider 418 then retrieves the message from mailbox 420 and transmits a data stream containing the message to base 402 for playback.

In step 816, the voicemail record is subsequently marked as old in a local data structure, for example, data structure 300.

The above steps are repeated until no new messages are encountered at which point the process moves to step 806.

FIG. 9 illustrates data structure 300 after a user performs a <review all new messages> operation. All records are now marked as old in the "New/Old" field.

Figure 10:
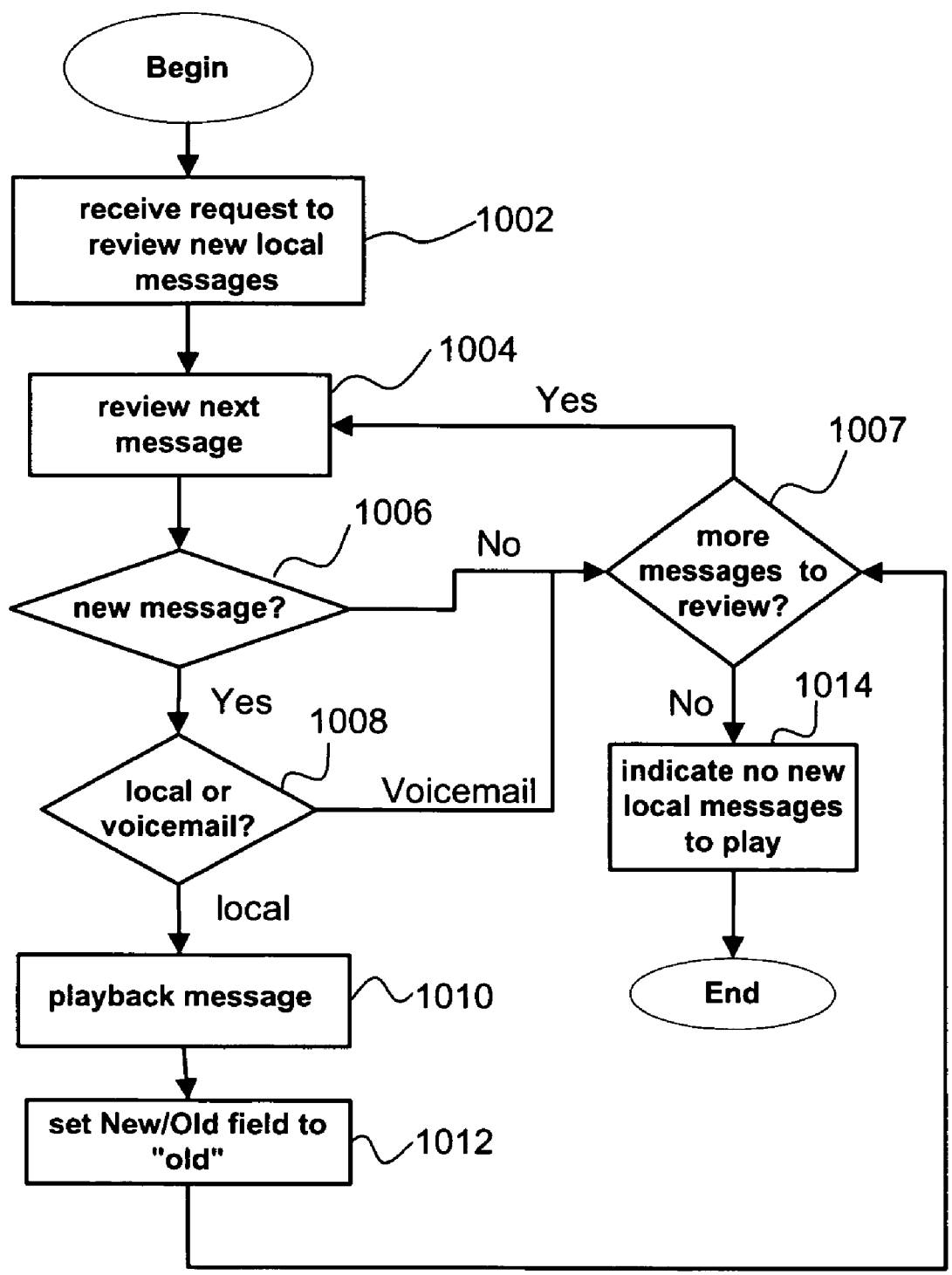
FIG. 10 illustrates exemplary steps involved in a process for managing messages from heterogeneous mailboxes according to another embodiment of the present invention.

FIG. 10 illustrates exemplary steps involved in a process for managing messages from heterogeneous mailboxes according to another embodiment of the present invention. In step 1002, a request is received to review local messages. For example, a user employing device 402 having keypad 443 enters <review all local messages>. CPU 440 then accesses data structure 300 of FIG. 7.

In step 1004, records stored in data structure 448 are accessed by CPU 440, for example, by executing a program to review messages. The message records are checked by reviewing a next message in a list of messages stored in chronological order to determine if there are any local messages to be displayed.

In step 1006, the system checks to see if the message is a new message. If the message is new, the process moves to step 1008.

In step 1006, if the message encountered is not new, the process moves to step 1007. At step 1007, if the system determines that more messages remain to be checked, the process returns to step 1004. When no more messages remain to be checked, the process moves to step 1014.

At step 1014, the system indicates that there are no new local messages to be reviewed, for example, by an audible announcement or visual display that there are no local messages to play.

In step 1008, the system checks to see if the message is a local message or a voicemail message. If a message record marked as "Voicemail" is encountered, the process moves to step 1007, where the system checks to see if there are more messages to review as described above.

If, at step 1008, a local message is encountered, the process moves to step 1010, where the message is played back to the user.

In step 1012, the system marks as old the message record corresponding to the local message that has just been played back. After step 1012, the process returns to step 1007 where the system checks to see if there are new messages, as described above.

Figure 11:
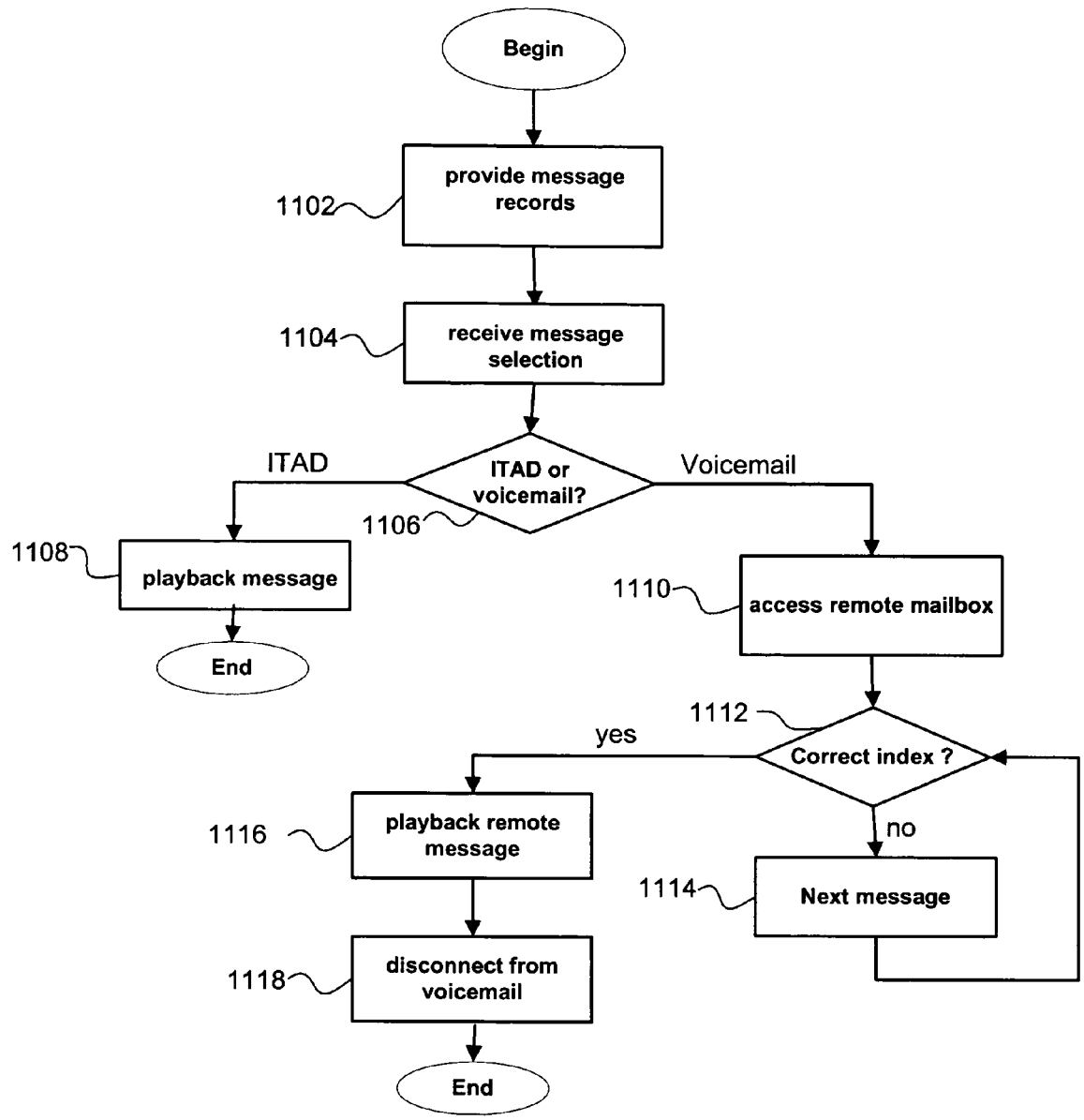
FIG. 11 illustrates a method for playing a designated message stored in one of a plurality of heterogeneous mailboxes, according to another embodiment of the present invention.

FIG. 11 illustrates a method for playing a designated message stored in one of a plurality of heterogeneous mailboxes according to another embodiment of the present invention.

In step 1102, a user at a base station or other phone device is provided with one or more message records. Preferably, the message record contains information contained in a data structure located in an interface, for example, interface 444, where the interface contains one or more message records related to stored messages contained in the plurality of heterogeneous mailboxes. For example, one or more message records of data structure 300 in FIG. 9 is provided to the user using system 402. The message records can be supplied to the user, for example, as a list displayed on LCD 442, or as a voice response on speakerphone 430.

In step 1104, a selection of a message to be played back is received. For example, the user selects a message record from data structure 300 of FIG. 9, by entering <play the message associated with this record> on a keypad, when information from the message record is displayed on LCD 442.

In step 1106, the system containing the interface checks to see which of the heterogeneous mailboxes contains the message to be played back. If the message is contained in a local ITAD, the process moves to step 1108, where a signal is sent to the ITAD mailbox, for example, mailbox 438, to playback the message.

Alternatively, if the message record indicates that the message is contained in a remote mailbox, for example, mailbox, 420, then the process moves to step 1110 where a signal is sent to connect to remote mailbox provider 418.

In step 1112, the messages located in the remote mailbox are skipped until the desired message is encountered. For example, if a user selects item 904 of data structure 300 to be played, the index value indicates that it is the third stored message in mailbox 420. Accordingly, messages corresponding to index values of 1 and 2 are skipped until the third message is encountered. If the index of the message to be received is not correct, the process moves to step 1114 where the next message is reviewed.

If the correct index is encountered the process moves to step 1116 where the remote message is played back to the user. Subsequently, in step 1118, the user at the base station is disconnected from the voicemail provider.

Figure 12:
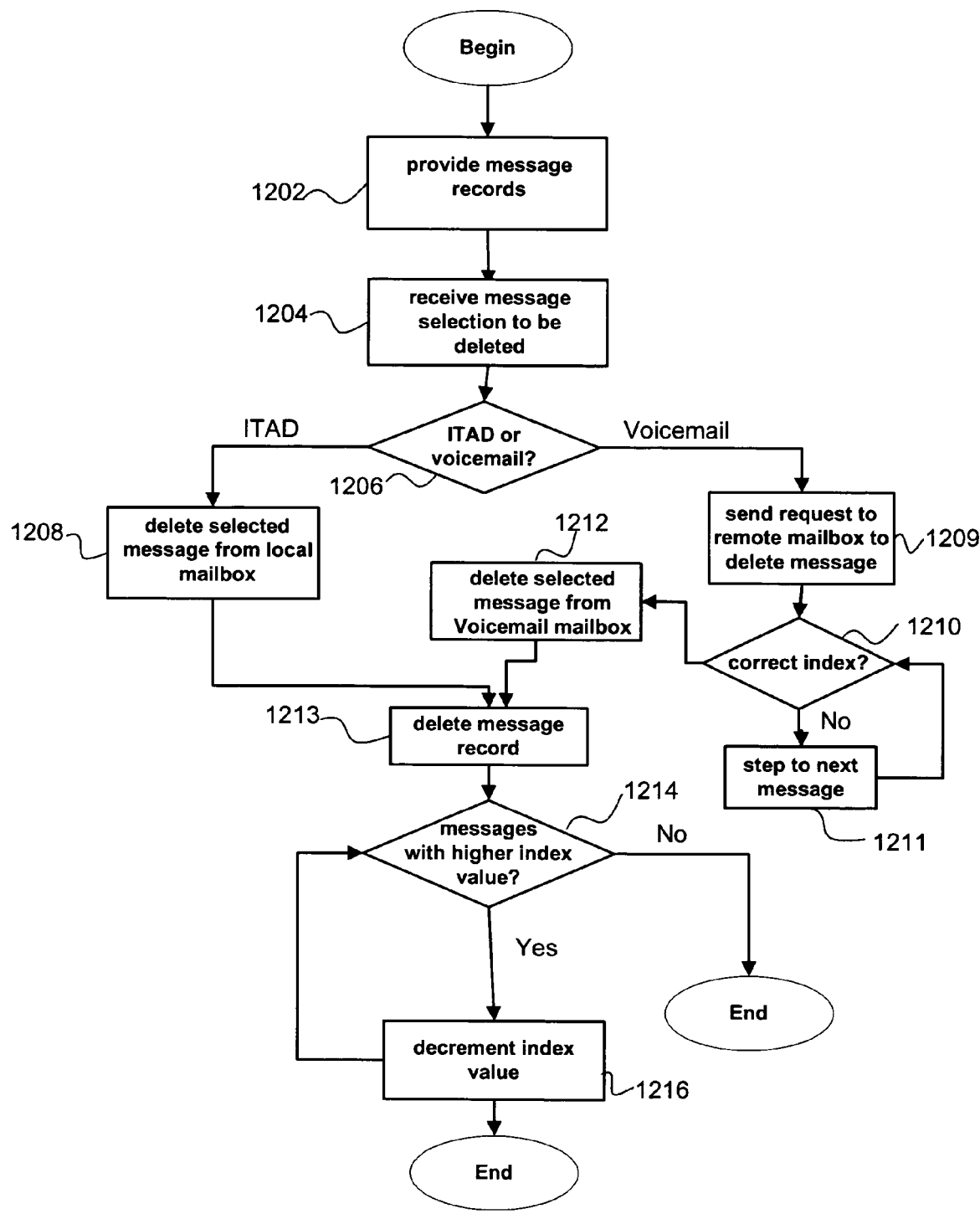
FIG. 12 illustrates exemplary steps in a method for using a common interface for deleting messages contained in one of a plurality of heterogeneous mailboxes, according to another embodiment of the present invention.

FIG. 12 illustrates exemplary steps in a method for using a common interface for deleting messages contained in one of a plurality of heterogeneous mailboxes, according to another embodiment of the present invention.

In step 1202, a user is provided with a selection of one or more message records. Preferably, the message record(s) contains information contained in a data structure located in an interface, for example, interface 444, where the interface contains one or more message records related to stored messages contained in the plurality of heterogeneous mailboxes. For example, one or more message records of data structure 300 in FIG. 9 is provided to the user using system 402. The message records can be supplied to the user, for example, as a list displayed on LCD 442, or as a voice response on speakerphone 430.

In step 1204, a selection of a message to be deleted is received. For example, a user may be prompted to manage a message record associated with a message that has just been played back to the user on speakerphone 430. The user is provided with a keypad selection to choose in order to delete the message. Alternatively, a user can view a list of message records on LCD 442, for example by entering a command such as <view all messages>. A chronological list of messages such as that shown in data structure 300 of FIG. 9 is then provided to display on LCD 442. A user can then scroll through the list of message records and, using a key of keypad 443, select a message to be deleted with or without playback before deletion.

In step 1206, the system containing the interface checks to see which of the heterogeneous mailboxes contains the message to be deleted. If the message is contained in a local ITAD, the process moves to step 1208, where a signal is sent to the ITAD mailbox, for example, mailbox 438, to delete the message. For example, a user selects record 903 in data structure 300 of FIG. 9 for deletion. The system checks to see that record 903 belongs to a message stored in mailbox 438, and forwards a signal to ITAD 436 indicating the message to be deleted.

Alternatively, if, in step 1206, the message record indicates that the message is contained in a remote mailbox, for example, mailbox, 420, then the process moves to step 1209, where a signal is sent to the remote mailbox provider 418, indicating the message to be deleted and requesting the provider to delete the message.

In step 1210, the remote mailbox provider, such as provider 418, checks to see if it has stepped to the correct index of a message to be deleted that is stored in a list of messages stored in the remote mailbox. If the index value of the message being checked does not correspond to that of the designated message to be deleted, the process moves to step 1211.

In step 1211, the remote mailbox provider steps to a next message and the process continues until the system determines that it has reached the correct index corresponding to the message to be deleted.

In step, 1212, the designated message is deleted in the remote mailbox.

In step 1213, the message record corresponding to the deleted message is deleted. For example, as illustrated in FIG. 13, record 903 is removed from data structure 300 of FIG. 9 to produce updated data structure 300.

In step 1214, the system checks to see if any message record contained in the updated data structure has an index value higher than the deleted message. If message records with a higher index numbers are found, the process moves to step 1216 in which the system decrements the index number. The process continues until no more records have higher index numbers than the deleted record. In the example of FIG. 13 updated local ITAD message records 904 and 905, formerly having index values of 4 and 5, now have values of 3 and 4, respectively.

Figure 14:
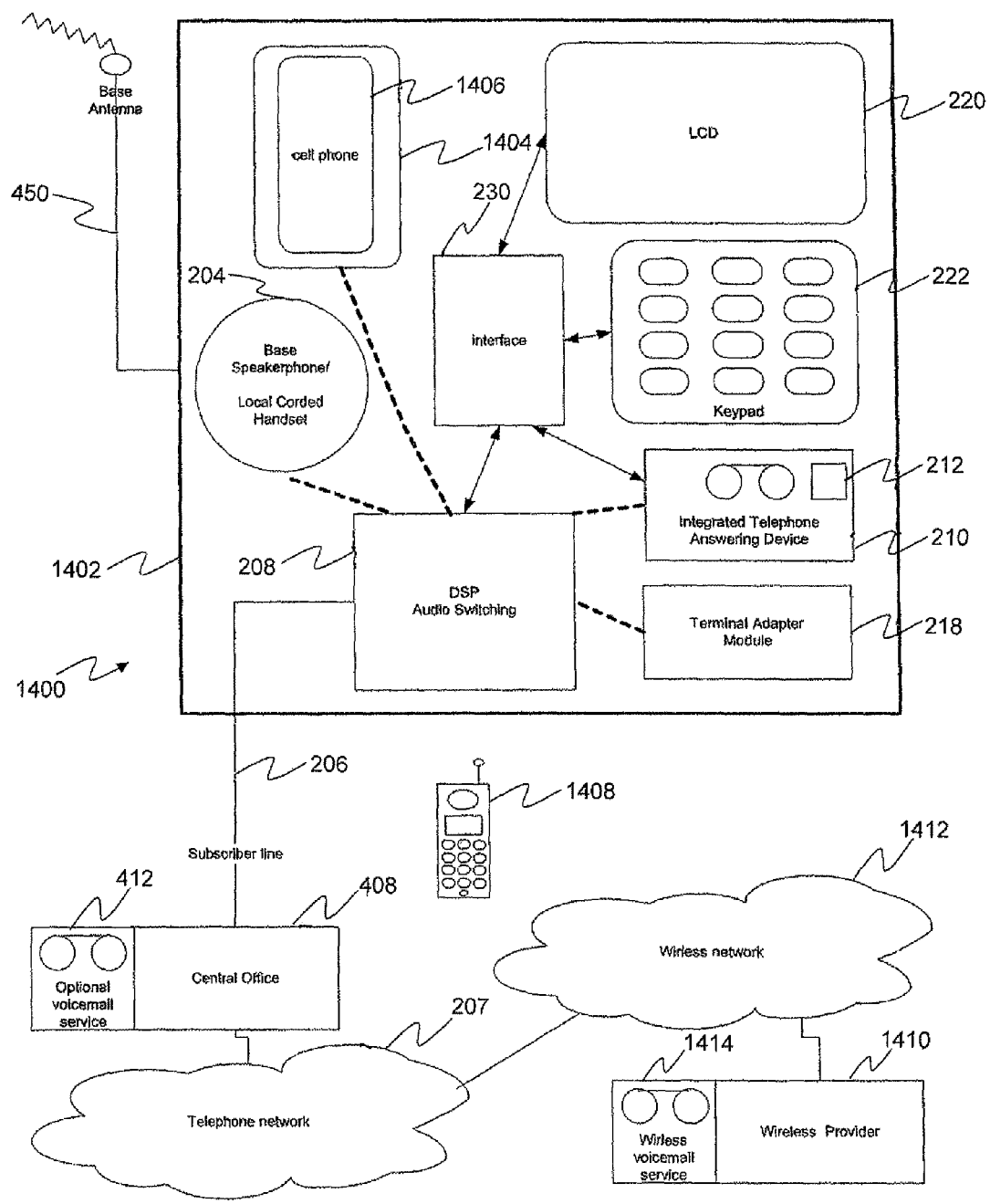
FIG. 14 depicts an integrated phone message management system according to another embodiment of the present invention.

FIG. 14 depicts an integrated phone message management system according to another embodiment of the present invention. System 1400 includes base 1402 that contains cell phone cradle 1404. Cradle 1404 is used to house a cell phone 1406 for a user who can access the cell phone line while at home through cordless handset 1408. Base 1402 is in communication with wireless provider 1410 through wireless network 1412. Thus, when a cell phone is placed in cradle a user can employ handset 1408 to send and receive messages over landline 206 or over a telephone number associated with cell phone 1406. Wireless provider 1410 contains wireless mailbox 1414 for storing messages from unanswered calls directed to the user's cell phone.

As in system 200 of FIG. 2, system 1400 provides an interface 230 used to receive input from local landline mailbox 212, and in this case from wireless mailbox 1414. In this embodiment, the system allows a user to manipulate messages in mailboxes 226 and 1414 as if the messages resided in a common mailbox, in a manner analogous to that described for systems 200 and 400 in reference to FIGS. 5-13.

Figure 15:
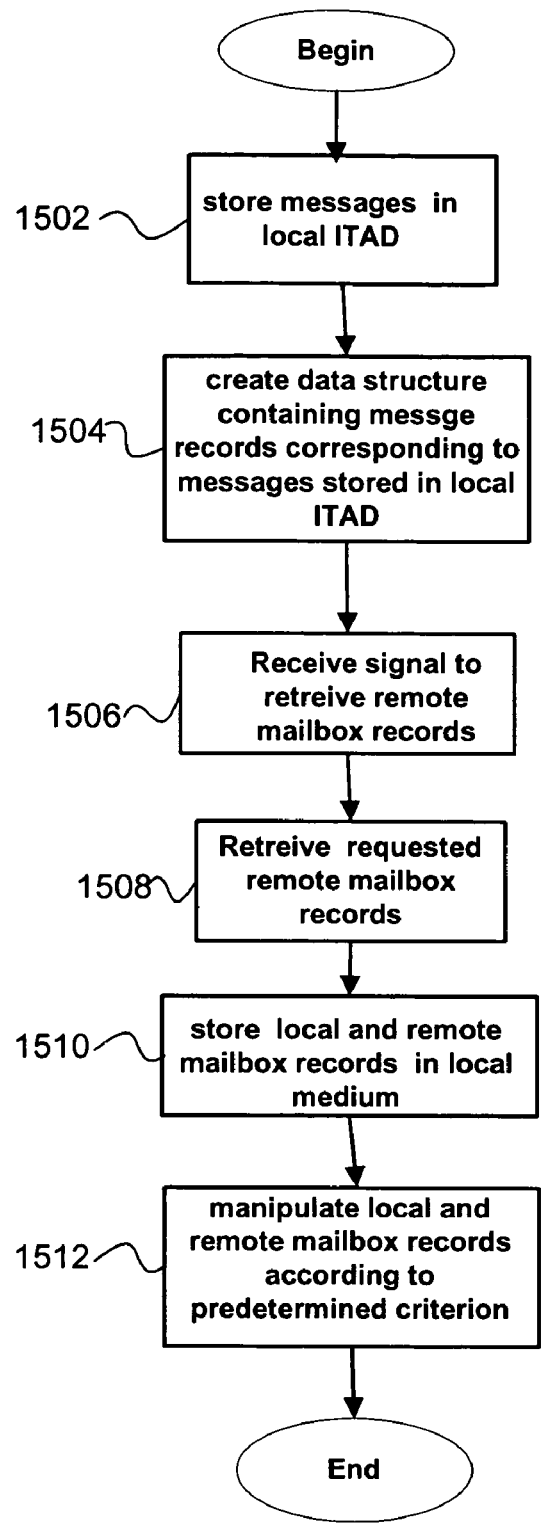
FIG. 15 illustrates exemplary steps involved in a process for heterogeneous mailbox management, according to another embodiment of the present invention.

FIG. 15 illustrates exemplary steps involved in a process for heterogeneous mailbox management, according to another embodiment of the present invention. In step 1502, local messages are stored in an ITAD of an integrated phone message management system, for example, system 400 of FIG. 4.

In step 1504, a message record list is created in a data structure of the phone message management system. In one embodiment, step 1504 comprises substeps 504-512, as described above with respect to FIG. 5. FIG. 16a illustrates an exemplary data structure 1600 including message records from messages stored in a local ITAD. In this example, data structure 1600 is stored in a local interface, for example interface 444 of FIG. 4, and contains only message records of messages recorded in the local ITAD. An advantage of this is that space is conserved in a non-volatile memory such as an EEPROM (not shown) used to store message records in interface 444, since data records from a remote mailbox are not stored in the EEPROM.

In step 1506, a signal is received to retrieve remote mailbox message records from a remote mailbox. For example, referring also to FIG. 4, a user may wish to review all unreviewed message records associated with phone messages recorded for calls placed to device 402, including those stored in local mailboxes 438 and VoIP mailbox 420. In one embodiment, the message records associated with the remote mailbox service provider are arranged in any convenient or known manner by the service provider. FIG. 16b illustrates a data structure 1620 that contains chronologically ordered message records pertaining to VoIP messages that are stored in mailbox 420. Data structure 1620 or any other known data structure or format containing VoIP message record information could be stored by VoIP provider 224 in a memory (not shown) remote from device 202, according to known methods. Data structure 1620 could additionally be accessed by a user using known methods. For example, a user employing a computer or graphics capable phone, could access data structure 1620 using a graphical user interface.

In step 1508, remote mailbox message records from a service provider associated with the remote mailbox, for example VoIP mailbox 420, are retrieved. For example, a user can query a VoIP service provider to provide a message record list of all stored messages in mailbox 420. In one embodiment, the message records are received and stored temporarily in a user's local phone message device, such as device 402. For example, data structure 1620 can be stored temporarily in a DRAM or other volatile memory (not shown) contained in or local to CPU 440.

In step 1510, local and remote mailbox records are stored in a common local medium. For example, a user wishing to view all stored message records associated with messages in mailboxes 212 and 226 may enter <show all undeleted messages>. In one embodiment, a local data structure, such as data structure 1600, is copied to a volatile or other local memory that temporarily stores the data structure received from the remote service provider. Furthermore, the remote and local data structures can be stored together in a common data structure residing in the temporary memory, thus creating, for example, a master data structure containing both ITAD and VoIP message records. FIG. 16c illustrates one example in which CPU 440 operating on program 446 assembles data structure 1640, comprising data records from data structures 1600 and 1620. Data structure 1640 illustrates one example in which data structures 1600 and 1620 are automatically merged to create a chronological interleaving of messages. Alternatively, a non-interleaved data structure 1660, such as that shown in FIG. 16d, could be created.

In step 1512, the user manipulates data records from the local and remote mailboxes according to a predetermined criterion. For example, the user can review messages according to chronological order received, message sender, and the like, as described above. After the user is done reviewing messages, the temporary data structure, such as data structure 1640 may be erased, for example, when a user returns to normal phone device operation. In the above example, the temporary data structure containing both local and remote message records is created in an integrated messaging device such as device 402. It other embodiments, a user operating a handset, such as handset 452, can load the temporary data structure into a temporary memory local to the handset in order to increase speed of message record manipulation when the handset is detached from the base device and communicating over an RF link. Thus, during download of remote data records from a remote source, the data records are transferred through a base device, for example, device 402 and to a requesting handset 452, using an RF link. The remote data records (as well as the local ITAD data records) can then be stored locally in the handset while the user is reviewing the data records.

An advantage of the method illustrated in FIG. 15 is that a user is guaranteed of being provided with correct status information of message records received from a remote service provider associated with the user's telephone device, because the message records from the remote provider are only sent to the local device upon demand. In the method illustrated in FIG. 5, the status of remote messages stored remotely is based on message records that are stored locally when a message waiting indicator is received. However, a VoIP user, for example, could manipulate messages (review, delete, etc.) using a remote computer without the local integrated message system, for example, device 402 being alerted. Thus, a data structure stored in device 402 that contains VoIP message records indicating the status of VoIP messages, may not reflect the current message status (i.e., the data structure is out of sync with the VoIP status) if the remote VoIP messages are accessed by other means, such as computer.

However, a system capable of manipulating data records according to the method of FIG. 15 can require more processing capability than that needed to operate according to methods illustrated in FIGS. 5, 8, 10-12 and the like.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. For example, embodiments discussed above disclose a system and method in which a user interacts with an interface to heterogeneous mailboxes through a keypad, speaker phone, or corded handset of a base station containing the interface. However, other embodiments in which a user interacts with the interface via a cordless handset communicating with a base station containing the interface have been contemplated by the inventor. Thus, through a keypad or speaker of a cordless handset a user can access and manipulate message records and corresponding phone messages contained in heterogeneous mailboxes, according to the methods disclosed above. In addition, the present invention can be practiced in integrated telephony devices in which a local ITAD mailbox and a voicemail service are associated with the same phone line.

Furthermore, the present invention is capable of implementation using multiple telephone numbers, as well as multiple mailboxes. Thus, the present invention is capable of providing a telephone device user with the ability to create and manipulate data structures containing message records from multiple phone mail mailboxes, where the data structure is arranged according to the methods and principles disclosed above. For example, the present invention can be practiced to create a data structure in an integrated telephone device comprising a chronological list of phone message records compiled from one local ITAD message record list and three voicemail message record lists. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for managing phone messages in a phone system containing heterogeneous mailboxes, comprising:
   storing in response to an incoming call a first phone message only in a first mailbox local to a telephone device, the first phone message being not previously stored in any mailbox remote from the telephone device, the first mailbox configured to store messages after a first telephone number associated with the telephone device is dialed, the first mailbox being accessible to a user through a first user interface, wherein the first mailbox is integrated with base unit of the telephone device;
   creating a first message record of the first phone message in a data structure;
   receiving at the telephone device a message indicating receipt of a second phone message in a second mailbox remote to the telephone device and configured to store messages after a second telephone number different from the first telephone number and associated with the telephone device is dialed, the second mailbox being accessible to the user through a second user interface substantially different from the first user interface; and creating a second message record of the second phone message in the data structure, wherein the first and second message records are maintained in the data structure in a sorted list.

2. The method of claim 1, further comprising:
automatically playing back the second message at the telephone device; and
marking the second message as old at the second mailbox.

3. The method of claim 1, wherein creating the first message record comprises at least one of:
recording a time received;
recording a message length;
recording caller information;
setting a mailbox location field to "local"; and
setting a message status field to "new".

4. The method of claim 1, wherein creating the second message record comprises at least one of:
recording a time received;
recording a message length;
recording caller information;
setting a mailbox location field to "Voicemail"; and
setting a message status field to "new".

5. The method of claim 1, wherein the first mailbox is located in an integrated telephone answering device local to the phone device.

6. The method of claim 5, wherein the second mailbox is a mailbox of a service provider over a data network.

7. The method of claim 6, wherein the second mailbox is a mailbox of a voice over internet protocol service provider.

8. The method of claim 5, wherein the second mailbox is a mailbox of a wireless telephony provider.

9. The method of claim 5, wherein the second mailbox is a remote voicemail mailbox of a land line telephony provider.

10. The method of claim 5, wherein the first mailbox is associated with messages received over a first telephone line, and the second mailbox is associated with messages received over a second telephone line that is associated with a wireless telephony network.

11. The method of claim 5, wherein the first mailbox and the second mailbox are associated with messages received over the same telephone line.

12. The method of claim 1, wherein the sorted list comprises a chronological list of message records.

13. The method of claim 1, further comprising:
selecting a criterion for playback of phone messages; and
playing back the phone messages associated with the data structure according to the selected criterion.

14. The method of claim 13, wherein the selected criterion is a time received of all message records in the data structure.

15. The method of claim 13, wherein the selected criterion is a time received of all new message records in the data structure.

16. The method of claim 13, wherein the selected criterion is a time received of all messages from a designated party.

17. The method of claim 1, further comprising:
receiving a selection of a phone message;
determining a location of a mailbox that contains the phone message;
accessing the remote mailbox if the phone message resides in the remote mailbox, wherein the remote mailbox includes messages based upon calls directed to a telephone device using a first telephone number; and
playing back the phone message if the phone message resides in the local mailbox, wherein the local mailbox includes messages received over a second telephone line that transmits calls to the telephone device that are directed to a second telephone number.

18. The method of claim 17, further comprising:
if the phone message resides in a remote mailbox, determining if an index value of a first message encountered in the remote mailbox matches an index of the phone message; and
playing back the remote message when the index of the first message encountered and the phone message match.

19. The method of claim 18, further comprising:
stepping to a subsequent message in the remote mailbox when the index of the first message encountered and the phone message do not match.

20. A system for managing heterogeneous phone mailboxes, comprising:
a local mailbox located in a telephone device, accessible to a user through a first user interface and linked through a first communications interface to a first telephone line that transmits calls to the telephone device that are directed to a first telephone number of the telephone device, wherein at the time of an incoming call directed to the first number a first phone message from the call is stored in the local mailbox and is not stored in any mailbox remote from the telephone device, wherein the local mailbox is integrated with base unit of the telephone device;
a second communications interface in the telephone device linked to a second telephone line associated with a second telephone number of the telephone device; and
receiving means at the telephone device receiving a message indicating receipt of a second phone message in a remote mailbox remote to the telephone device and configured to store messages after the second telephone number different from the first telephone number is dialed;
an integrated mailbox interface located in the telephone device and configured to receive message information related to messages stored in the local mailbox and messages stored in the remote mailbox and accessible to the user through a second user interface substantially different from the first user interface, wherein the integrated mailbox interface comprises a data structure that is configured to contain message records associated with messages stored in the local mailbox and the remote mailbox, wherein an ordered master message list is created.

21. The system of claim 20, further comprising an integrated telephone answering device that contains the local mailbox.

22. The system of claim 20, wherein the first telephone line comprises a land line.

23. The system of claim 21, wherein the second telephone line is linked to a voice over internet protocol (VoIP) provider, and the remote mail box is a VoIP mailbox.

24. The system of claim 21, wherein the second telephone line is associated with a wireless telephony network and the remote mailbox comprises a voicemail mailbox associated with a wireless telephony provider.

25. The system of claim 21, wherein the second mailbox is a remote voicemail mailbox of a land line telephony provider.

26. The system of claim 21, wherein the first telephone line and the second telephone line are the same telephone line.

27. The system of claim 20, wherein the integrated mailbox interface further comprises a program operable on the data structure, wherein the message records are ordered, updated, and deleted.

28. The system of claim 27, wherein the data structure is stored in a non-volatile memory device.

29. The system of claim 27, further comprising:
a speaker for playback of a recorded phone message; and
a central processing unit (CPU) that receives a message waiting indicator when a remote phone message is recorded in the remote mailbox.

30. The system of claim 29, wherein the CPU retrieves the remote phone message for playback after receiving a message waiting indicator, wherein the integrated mailbox interface is triggered to create a message record for the remote message.

31. A hybrid phone device for integrated phone message management, comprising:
a base station linked to a first telephone line that transmits calls to the hybrid phone device that are directed to a first telephone number;
an integrated telephone answering device containing a local mailbox linked to the first telephone line to store messages based on the calls directed to the first telephone number, the local mailbox being accessible to a user through a first user interface, wherein a first phone message from a call directed to the first number is stored in the local mailbox at the time of the call and is not stored in any mailbox remote from the telephone device, wherein the local mailbox is integrated with base unit of the telephone device;
a terminal adapter module linked to the base station and linked to a second telephone line associated with a second phone number of the hybrid phone device for connecting to a voice over internet protocol (VoIP) provider; and a receiving means at the hybrid phone device receiving a message indicating receipt of a second phone message in a VoIP mailbox remote to the hybrid phone device and configured to store messages after the second phone number different from the first telephone number is dialed;
an integrated mailbox interface that receives message information related to messages stored in the local mailbox and messages stored in the VoIP mailbox associated with the VoIP provider, the VoIP mailbox being accessible to the user through a second user interface substantially different from the first user interface, wherein the integrated mailbox interface comprises a data structure that contains message records associated with messages stored in the local mailbox and the VoIP mailbox, wherein an ordered master message list is created.

32. The hybrid phone device of claim 31, wherein the first telephone line comprises a land line.

33. The hybrid phone device of claim 31, wherein the integrated mailbox interface further comprises a program operable on the data structure, wherein the message records are ordered, updated, and deleted.

34. The hybrid phone device of claim 33, wherein the data structure comprises a non-volatile memory.

35. The hybrid phone device of claim 31, further comprising one or more wireless handsets for communication with the base station.

36. The hybrid phone device of claim 31, further comprising:
a speaker for playback of a recorded phone message; and
a central processing unit (CPU) that receives a message waiting indicator when a remote phone message is recorded in the VoIP mailbox.

37. The hybrid phone device of claim 36, wherein the CPU retrieves the VoIP phone message for playback after receiving a message waiting indicator, wherein the integrated mailbox interface is triggered to create a message record for the VoIP message.

38. The hybrid phone device of claim 31, further comprising:
an interface to a wireless telephone network; and
a cradle for housing a cell phone linked to the wireless telephone network.

39. The hybrid phone device of claim 38, wherein the integrated mailbox interface is configured to create a message record associated with a message stored in a wireless voicemail mailbox of the wireless telephony network, after the system retrieves the message from the wireless voicemail mailbox.

40. A method for managing phone messages in a phone system containing heterogeneous mailboxes, comprising:
storing, in response to an incoming call, only in a first mailbox local to a telephone device, a local phone message received over a first telephone line that transmits calls directed to a first telephone number, the first mailbox being accessible to the user through a first user interface, the first mailbox disposed in a device that is one of directly connected to the telephone device and part of the telephone device, the local phone message not previously being stored in any mailbox remote from the telephone device;
creating a local mailbox message record of the local phone message in a local data structure configured to contain local mailbox message records; receiving at the telephone device a message indicating receipt of a second phone message in a remote mailbox remote to the telephone device and configured to store messages after a second telephone number different from the first telephone number and associated with the telephone device is dialed;
receiving a request to retrieve a set of remote mailbox message records associated with the remote mailbox, the remote mailbox being accessible to the user through a second user interface substantially different from the first user interface, and the remote mailbox message records corresponding to messages stored in the remote mailbox and based upon calls directed to the telephone device using the second telephone number;
retrieving the set of remote mailbox message records from the remote mailbox;
storing the local and remote mailbox message records in a sorted list of a local temporary storage medium of the telephone device; and
managing the local and remote mailbox message records according to a predetermined criterion.

41. The method of claim 40, wherein the predetermined criterion comprises a chronological order received of each mailbox message.

42. The method of claim 40, wherein the remote mailbox is a VoIP mailbox.

43. The method of claim 40, wherein the local temporary storage medium resides in a handset in RF communication with the telephone device.

44. A method for playing back phone messages in a phone system containing heterogeneous mailboxes, comprising:
creating a data structure containing a first message record associated with a first mailbox local to a telephone device, the first mailbox being accessible to a user through a first user interface and configured to receive messages based upon calls directed to a first telephone number associated with the telephone device, the first mailbox disposed in a device that is one of directly connected to the telephone device and part of the telephone device, wherein at a time of a call directed to the first number a first phone message from the call is only stored in the local mailbox and is not stored in any mailbox remote from the telephone device, receiving at the telephone device a message indicating receipt of a second phone message in a remote mailbox remote to the telephone device and configured to store messages after a second telephone number different from the first telephone number and associated with the telephone device is dialed the data structure further containing, the remote mailbox being accessible to the user through a second user interface substantially different from the first user interface;

creating a second message record of the second phone message in the data structure, wherein the first and second message records are maintained in the data structure in a sorted list receiving a signal to playback messages associated with the data structure; and playing back the messages according to a predetermined criterion.

45. The method of claim 44, wherein the predetermined criterion is a time received associated with the message records.

* * * * *

UNITED STATES PATENT AND TRADEMARK OFFICE
CERTIFICATE OF CORRECTION

PATENT NO. : 7,856,088 B2
APPLICATION NO. : 11/027942
DATED : December 21, 2010
INVENTOR(S) : Holger Janssen Page 1 of 1

It is certified that error appears in the above-identified patent and that said Letters Patent is hereby corrected as shown below:

Column 19, line 13, after "dialed", delete "the data structure further containing";

Column 20, line 6, after "sorted list", insert -- ; --.

Signed and Sealed this
First Day of March, 2011

David J. Kappos
*Director of the United States Patent and Trademark Office*